No. 837,902. PATENTED DEC. 4, 1906.
J. C. W. GRETH.
FILTER STRAINER NOZZLE.
APPLICATION FILED NOV. 18, 1905.
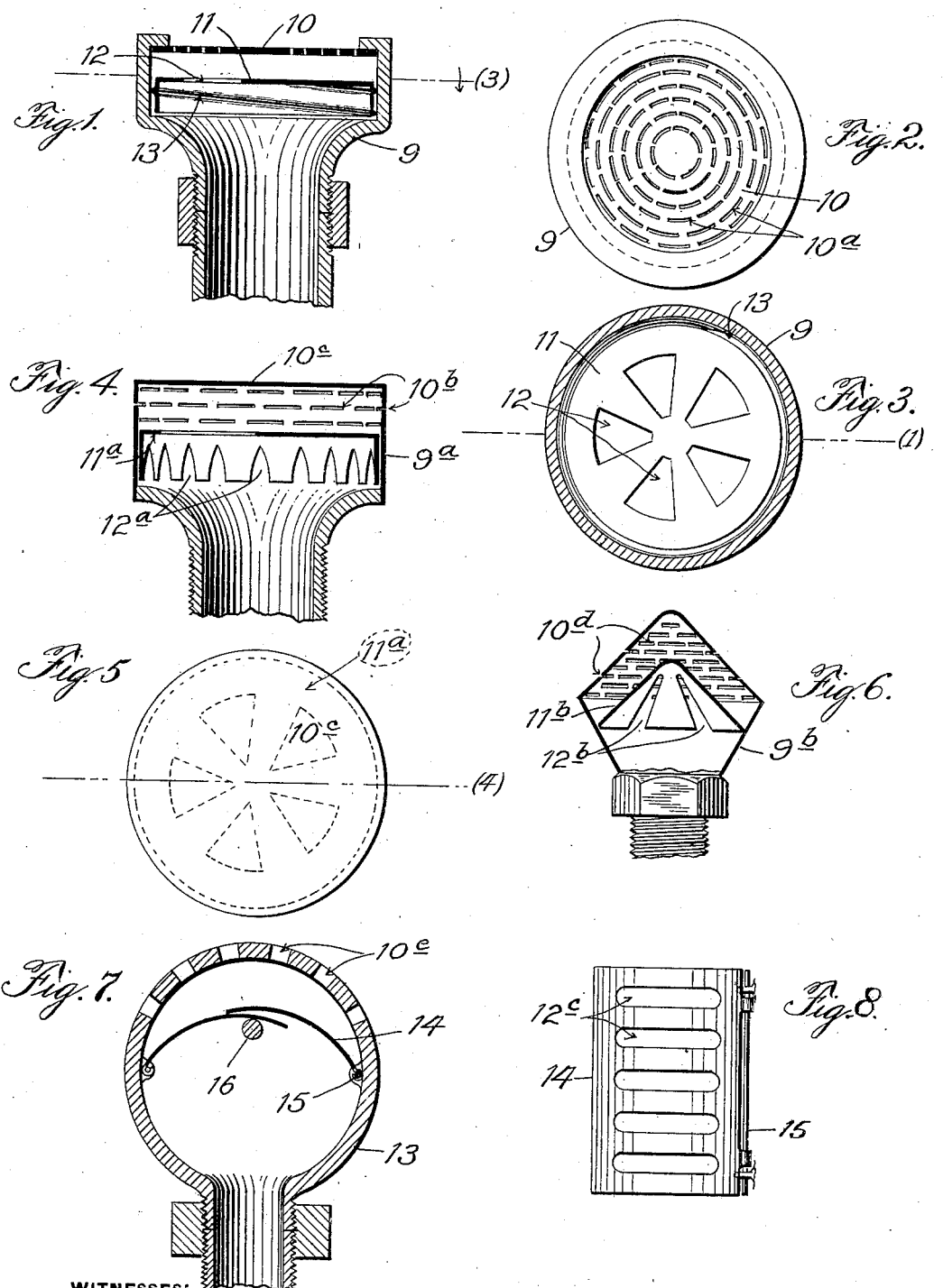

UNITED STATES PATENT OFFICE.

JOHN C. W. GRETH, OF PITTSBURG, PENNSYLVANIA.

FILTER STRAINER-NOZZLE.

No. 837,902.  Specification of Letters Patent.  Patented Dec. 4, 1906.

Application filed November 18, 1905. Serial No. 288,040.

*To all whom it may concern:*

Be it known that I, JOHN C. W. GRETH, a citizen of the United States, residing at Pittsburg, in the State of Pennsylvania, have invented certain new and useful Improvements in Filter Strainer-Nozzles, of which the following is a specification.

My invention relates to filters having numerous outlets in the form of strainer-nozzles, and particularly to the construction of such outlets.

The objects are to provide nozzles adapted to facilitate washing the filter by reverse flow through the nozzles, to provide a nozzle which automatically restricts the capacity or volume of flow therethrough when the current is reversed, to provide a strainer-nozzle with a partial check-valve automatically closing some of the strainer-perforations when the flow is reversed, and to generally improve the efficiency of the outlet-nozzle for use as an injecting-nozzle for washing the filter.

The invention also embraces the specific design of such nozzles.

These objects and other advantages are attained by the construction illustrated in several forms in the accompanying drawings, wherein—

Figures 1 and 2 are respectively a central vertical section and a plan of a strainer-nozzle with my improvements. Fig. 3 is a section on line 3 in Fig. 1, showing the restricting-valve in plan. Fig. 4 is a central vertical section of the device modified and applied to a nozzle having radial orifices in the sides only, and Fig. 5 is a top plan of the same. Fig. 6 is a similar section of a modified form of the parts where the nozzle is given a conical form. Fig. 7 is a central vertical cross-section showing another modification with the nozzle in the form of a short cylinder and another form of my improvement applied thereto, and Fig. 8 is a plan view of one of the flaps of the restricting-valve in Fig. 7.

In well-designed filters the outlet-pipe has a capacity, flowing under a given head or pressure, of about the combined capacities of all the outlet-nozzles distributed over the filter-bed and connected to the outlet, when the flow is perfectly easy and free through these nozzles without pressure. When to wash the filter the current is reversed and water is forced inward through the outlet-pipe and nozzles, the actual combined area of the perforations in all the nozzles being much greater than the cross-section of said pipe, the pressure at the nozzle can nowhere be equal to the pressure in the pipe—that is, the water-pressure is not effective in washing, because its outlet through the nozzles is larger than the sectional area of the pipe and the force is thus dissipated. It frequently happens, indeed, that the water forced into the pipe all escapes through a few of the nozzles near the pipe and other parts of the filter are not washed at all, the inward flow through the nozzles not being strong enough to have any effect. To overcome this difficulty and cause strong jets of water under pressure to flow through all the nozzles, I provide for restricting the passages or partially closing the perforations or slits in the strainer-nozzle during this reverse flow. Such restriction is usually proportioned so as to make the combined capacity of nozzle-openings at the pressure on them about equal to the capacity of the outlet-pipe at the pressure in it, so that the water issues under pressure everywhere in jets having force enough to dislodge the detritus and clean the filter-bed.

No particular construction of the nozzles is essential to my invention. In the form of Figs. 1 to 3 the head 9 has a perforate flat top strainer-plate 10 with circumferentially-arranged narrow slits $10^a$ therein. Inside the nozzle is a loose valve-disk 11 with a depending flange to stiffen and to guide it and openings 12 of equal or greater capacity than the strainer-disk openings, but arranged so as to partially close the latter when the valve is raised up to make contact with the strainer-disk 10. Preferably I provide some means, such as the inclined ribs 13 on the valve-flange, to cause the valve to rotate slightly as it rises and falls in order to wear evenly and to close different ones of slits $10^a$ from time to time and to better dislodge any dirt between the two disks.

In the case of nozzles having a solid top and lateral or radial perforations, as in Fig. 4, the top of the valve $11^a$ being mostly cut out, as in Fig. 3, the slits $10^b$ in the sides of the nozzle are partially closed by the flange of the valve, which has openings $12^a$ cut out and made in suitable form to close the proper proportion of the strainer-slits $10^b$ when the valve rises.

In Fig. 6 I show a nozzle $9^b$ of conical form, and the valve $11^b$ corresponds in shape and has openings 12$^b$ therein to partially close slits 10$^d$ of the strainer when the valve rises into contact with the same.

For use in strainer-nozzles of the cylindrical form shown in Fig. 7 I make the valve in the form of two flaps 14, which have openings 12$^c$ and are hinged at 15 to the side walls of the head 13 and being curved to fit the head when raised, so as to partially cover the perforations 10$^e$ therein, are normally supported on a rod or projection 16 on the flat end walls of the nozzle.

In all the forms shown it will be apparent that when water is flowing downward out of the filter into the nozzles the valves will not obstruct the flow; but when water is forced inward the valves will be automatically raised and brought into contact with the strainer-surface, and will thus close some of the openings therein, so as to reduce the effective area, restrict the volume of flow as desired, and cause the water to issue in jets under pressure and with force. The advantages of the device will be apparent to those familiar with the art.

Having thus described my invention and illustrated its use, what I claim as new, and desire to secure by Letters Patent, is the following:

1. The combination with a perforate strainer-nozzle, of devices therein operated by the fluid flowing therethrough to allow full flow in one direction and to partially close the perforations of the strainer when the flow is reversed.

2. The combination with a strainer-nozzle, of a valve therein adapted to allow full flow of the fluid in one direction and movable to lie over and partially close the strainer-perforations when the flow is reversed through the strainer.

3. The combination with a perforate outlet-nozzle, of a movable perforate member therein normally allowing free flow through the nozzle, but automatically partially covering the perforations of the nozzle to restrict the flow, when the said flow is reversed in direction.

4. A filter strainer-nozzle having openings, combined with a valve adapted to be seated over the openings and partially restricting them when the water flows out of the nozzle, but to drop and entirely uncover the nozzle-openings when the flow is into the same, substantially as described.

5. A strainer having a perforate plate with openings of combined area approximately equal to those in the strainer, being sustained near it and adapted to allow free flow through the strainer in one direction but to partially close it when the flow is reversed therethrough.

6. A strainer-nozzle combined with a perforate valve supported in the nozzle and adapted to contact with and partially close the strainer-surface when the flow is reversed and having means to change its relative position upon successively making contacts therewith.

In testimony whereof I have hereunto signed my name in the presence of the two subscribing witnesses.

JOHN C. W. GRETH.

Witnesses:
F. E. GAITHER,
F. W. H. CLAY.